(12) United States Patent
Swett et al.

(10) Patent No.: US 8,719,313 B2
(45) Date of Patent: *May 6, 2014

(54) DISTRIBUTED DATA STORE WITH A DESIGNATED MASTER TO ENSURE CONSISTENCY

(75) Inventors: Ian Swett, Pasadena, CA (US); W. Daniel Hillis, Encino, CA (US)

(73) Assignee: Applied Minds, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,240

(22) Filed: Sep. 4, 2012

(65) Prior Publication Data

US 2012/0330893 A1 Dec. 27, 2012

Related U.S. Application Data

(63) Continuation of application No. 12/558,453, filed on Sep. 11, 2009, now Pat. No. 8,275,804, which is a continuation-in-part of application No. 11/300,950, filed on Dec. 14, 2005, now Pat. No. 7,590,635.

(60) Provisional application No. 60/636,822, filed on Dec. 15, 2004.

(51) Int. Cl.
*G06F 17/30* (2006.01)

(52) U.S. Cl.
CPC .............. *G06F 17/30017* (2013.01)
USPC ...................................................... 707/802

(58) Field of Classification Search
USPC .......... 707/770, 791, 796, 802, 803, 804, 812
See application file for complete search history.

(56) References Cited

U.S. PATENT DOCUMENTS

| | | |
|---|---|---|
| 4,933,936 A | 6/1990 | Rasmussen et al. |
| 5,454,101 A | 9/1995 | Mackay et al. |
| 5,694,593 A | 12/1997 | Baclawski |
| 5,758,347 A | 5/1998 | Lo et al. |
| 5,799,322 A | 8/1998 | Mosher |
| 5,857,207 A | 1/1999 | Lo et al. |
| 5,870,764 A | 2/1999 | Lo et al. |
| 5,924,090 A | 7/1999 | Krellenstein |
| 6,016,489 A | 1/2000 | Cavanaugh et al. |
| 6,018,524 A | 1/2000 | Turner et al. |

(Continued)

OTHER PUBLICATIONS

Takao Okubo, et al., An Optimistic Method for Updating Information in Distributed CollaborativeWork, 1998, IEEE, 400-405.*

(Continued)

*Primary Examiner* — Jean B Fleurantin
(74) *Attorney, Agent, or Firm* — Michael A. Glenn; Perkins Coie LLP

(57) ABSTRACT

One machine, i.e. computer, on a network, such as associated with a distributed database, e.g. a data store or a partition thereof, is designated as a master, which alone can issue system orderstamps for transactional operations, while other machines associated with the data store or partition thereof act as any of clients that submit transactions to the master, or as slaves that adhere to updates from the master. If a transactional operation on the distributed database is attempted on a client machine, and communication cannot be established with the master machine, the transaction fails. The distributed data store having such a master provides a method that decreases transaction time across the distributed database, and maintains consistent data between separate machines.

30 Claims, 15 Drawing Sheets

(56) References Cited

U.S. PATENT DOCUMENTS

| | | | |
|---|---|---|---|
| 6,026,413 | A | 2/2000 | Challenger et al. |
| 6,115,705 | A | 9/2000 | Larson |
| 6,308,169 | B1 | 10/2001 | Ronstrom et al. |
| 6,442,565 | B1 | 8/2002 | Tyra et al. |
| 6,484,161 | B1 | 11/2002 | Chipalkatti et al. |
| 6,578,131 | B1 | 6/2003 | Larson et al. |
| 6,876,656 | B2 | 4/2005 | Brewer et al. |
| 6,904,454 | B2 | 6/2005 | Stickler |
| 7,047,242 | B1 | 5/2006 | Ponte |
| 7,080,088 | B1 | 7/2006 | Lau |
| 7,116,666 | B2 | 10/2006 | Brewer et al. |
| 7,127,551 | B2 | 10/2006 | Beck |
| 7,152,165 | B1 | 12/2006 | Maheshwari et al. |
| 7,281,024 | B1 | 10/2007 | Banerjee et al. |
| 7,290,019 | B2 | 10/2007 | Bjorner |
| 7,313,581 | B1 | 12/2007 | Bachmann et al. |
| 7,512,638 | B2 | 3/2009 | Jhaveri et al. |
| 7,590,635 | B2 | 9/2009 | Hillis et al. |
| 7,774,308 | B2 | 8/2010 | Hillis |
| 8,024,377 | B2 | 9/2011 | Hillis |
| 2002/0036617 | A1 | 3/2002 | Pryor |
| 2002/0052872 | A1 | 5/2002 | Yada |
| 2002/0059272 | A1 | 5/2002 | Porter |
| 2002/0064280 | A1 | 5/2002 | Gassho |
| 2002/0156798 | A1 | 10/2002 | Larue |
| 2003/0023609 | A1 | 1/2003 | Della et al. |
| 2003/0051066 | A1 | 3/2003 | Pace et al. |
| 2003/0163597 | A1 | 8/2003 | Hellman et al. |
| 2003/0217081 | A1 | 11/2003 | White et al. |
| 2004/0177100 | A1 | 9/2004 | Bjorner et al. |
| 2004/0236720 | A1 | 11/2004 | Basso et al. |
| 2005/0021817 | A1* | 1/2005 | Shimizu et al. ............... 709/231 |
| 2005/0060647 | A1 | 3/2005 | Doan et al. |
| 2005/0185578 | A1 | 8/2005 | Padmanabhan et al. |
| 2005/0193024 | A1 | 9/2005 | Beyer et al. |
| 2005/0203901 | A1 | 9/2005 | Waldvogel et al. |
| 2005/0207353 | A1 | 9/2005 | Goryavsky |
| 2006/0022955 | A1 | 2/2006 | Kennedy |
| 2006/0026117 | A1 | 2/2006 | Raman et al. |
| 2006/0026444 | A1 | 2/2006 | Asano et al. |
| 2006/0129517 | A1 | 6/2006 | Hillis |
| 2006/0129540 | A1 | 6/2006 | Hillis et al. |
| 2006/0168154 | A1 | 7/2006 | Zhang et al. |
| 2006/0218167 | A1 | 9/2006 | Bosley et al. |
| 2006/0267998 | A1 | 11/2006 | Walls et al. |
| 2007/0006119 | A1 | 1/2007 | Price |
| 2007/0061817 | A1 | 3/2007 | Atkinson et al. |
| 2007/0174483 | A1 | 7/2007 | Raj et al. |

OTHER PUBLICATIONS

Ratnasamy, et al., "A Scalable Content-Addressable Network", Proc. ACM SIGCOMM 2001, Aug. 2001, pp. 161-172.

"Content Addressable Network", retrieved online from url: http://en.wikipedia.org/siki/Content_addressable_network, May 2005, 1 page.

"Content-Addressable Network Model", Information Visualization Cyberinfrastructure, SLIS Indiana University, Jul. 10, 2004, 3 pages.

Abiteboul, et al., "Compact Labeling Schemes for Ancestors Queries", Symposium on Discrete Algorithms, ISBN 0-89871-4907, specifically p. 554, ISBN 0-89871-4907, specifically p. 554, Jan. 2001, 547-556.

Bosworth, Adam , "IT Conversations New Ideas Through Your Headphones", Santa Clara, California, Apr. 18-25, 2005, 1-5.

Cesa-Bianchi, Nicolò et al., "Minimizing regret with label efficient prediction", IEEE, vol. 51, Jun. 2005, pp. 2152-2162.

Crespo, et al., "Semantic Overlay Networks for P2P Systems", Technical Report, Stanford University, Jan. 2003, Total of 16 pages.

Dean, Jeff , "Google's Big Table", Google Blogoscoped, by Philipp Lenssen, Univ. of Washington, Oct. 18, 2005, 4 pages.

Deng, Chao et al., "Multi-Agent Framework for Distributed Systems", Aug. 26-29, 2004; IEEE, vol. 1, 22-25.

Duong, et al., "LSDX: A new labelling scheme for dynamically updating XML data", ACM, Jan. 2005, pp. 185-193.

Huebsch, et al., "Querying the Internet with PIER", Proceedings of the 29th VLDB Conference, Berlin, Germany, Sep. 2003, 12 pages.

Larson, "Dynamic Hash Tables", Communications of the ACM, vol. 31, No. 4, Apr. 1998, pp. 446-457.

Reed, David P. , "Naming and Synchronization in a Decentralized Computer System", Massachusetts Institute of Technology, Sep. 1978, 188 pages.

Stonebraker, et al., "Mariposa: A Wide-Area Distributed Database System", The VLDB Journal, Dept of Electrical Engineering & Computer Sciences, Univ. of Calif. Berkeley, Jan. 1996, pp. 48-63.

Wade, S , "An Investigation into the Use of the Tuple Space Paradigm in Mobile Computing Environments", Ph.D Dissertation Lancaster University, England., Sep. 1999, 236 Pages.

* cited by examiner

Harold

|  | Time | Withdrawal | Deposit | Balance |
|---|---|---|---|---|
|  | $T_0$ |  |  | $1,000.00 |
| Terminal 1 | $T_1$ | $600.00 | — | $400.00 |
| Terminal 2 | $T_2$ | $300.00 | — | ? |

Betty

Query through Terminal 2 before 2nd withdrawal would show $400 before $T_2$ when data is consistent (ending balance $100 after $300 withdrawal at $T_2$)

Fig. 16

Harold

|  | Time | Withdrawal | Deposit | Balance |
|---|---|---|---|---|
|  | $T_0$ |  |  | $1,000.00 |
| Terminal 1 | $T_1$ | — | $350.00 | $1,350.00 |
| Terminal 2 | $T_2$ | $300.00 | — | ? |

Betty

Query through Terminal 2 before withdrawal would show $1,350 before $T_2$ when data is consistent (ending balance $1,050 after $300 withdrawal at $T_2$)

Fig. 17

DISTRIBUTED DATA STORE WITH A DESIGNATED MASTER TO ENSURE CONSISTENCY

CROSS-REFERENCE TO RELATED APPLICATIONS

This application is a Continuation of and claims priority to application Ser. No. 12/558,453, filed 11 Sep. 2009 now U.S. Pat. No. 8,275,804, which is a Continuation in Part and claims priority for commonly disclosed subject matter to application Ser. No. 11/300,950, filed 14 Dec. 2005, which was issued as U.S. Pat. No. 7,590,635 on 15 Sep. 2009, which claims priority to U.S. Provisional Patent Application Ser. No. 60/636,822, filed 15 Dec. 2004, which are each incorporated herein in their entirety by this reference thereto.

The Application is also related to PCT Application No. PCT/US05/45685, filed 15 Dec. 2005, which claims priority to application Ser. No. 11/300,950, filed 14 Dec. 2005, which was issued as U.S. Pat. No. 7,590,635 on 15 Sep. 2009, which claims priority to U.S. Provisional Patent Application Ser. No. 60/636,822, filed 15 Dec. 2004.

The Applicants hereby rescind any disclaimer of claim scope in the parent Application(s) or the prosecution history thereof and advises the USPTO that the claims in this Application may be broader than any claim in the parent Application(s).

BACKGROUND OF THE INVENTION

1. Technical Field

The invention relates to distributed data stores. More particularly, the invention relates to a distributed data store with a designated master.

2. Description of the Prior Art

A data store offers insert and delete operations on a set of data items called a collection. Each data item in the collection is called an entry. The set of all possible entries is called the universal set. A tile is a subset of the universal set that exists on a physical machine. Insert operations add entries to the collection. Delete operations remove entries from the collection. A query operation specifies a subset of the universal set, and the data store indicates which elements of that subset are entries within the collection. A query is said to cover an entry if the subset specified by the query contains the entry.

Data is frequently maintained in several locations, i.e. machines or computers. A distributed data store is a data store implemented using multiple computers and communication links among the computers.

A distributed data store may provide redundancy, meaning that multiple computers may record the same entry. Redundancy can ensure high availability, meaning that the distributed data store can respond quickly to queries from different locations and can respond to many queries at once. Redundancy can also ensure failover, meaning that even when some computers fail, the distributed data store can continue to respond to queries accurately.

Each computer in a distributed data store covers some subset of the universal set, meaning that each computer records any entries in that subset. In a distributed data store providing redundancy, an entry may be covered by multiple computers. Thus, inserted entries are propagated to multiple computers. The times to propagate to different computers may differ, causing an insert to be recorded at some computers before others. Delete operations also propagate to multiple computers. Thus, an entry may be deleted from some computers before others.

Consistency of data between machines is a major issue, as accurate transactions depend on agreement of data throughout the network. Conversely, conflicts and erroneous returns may arise due to data updates arriving variously before and after transactions.

For example, if two withdrawals are made from the same bank account but from different locations, it is important that each location have the correct balance to avoid withdrawing more money than is in the account. This is an example of a transactional operation.

Up-to-date data is less important for non-transactional operations. Continuing the above example, deposits may safely be made to the same account from two different unconnected locations, as long as the balance is updated and consistent before any transactional operations, such as withdrawals, need to take place.

One concept to ensure consistency is referred to as settling time. This rule states that once a tile of data has settled to a time, the data in that tile is immutable, and is not allowed to be altered. For example, if the settling time is one minute, once a transaction has taken place on a volume of data, one minute must elapse before another operation on that data can take place.

In some prior systems, answers to queries may change over time, as transactions from various sources propagate through a network to different members of a distributed data store. Although such prior systems may maintain a record of all transactions and may notify the user if the answer to their query has changed, the changed information may already have been acted on and affected further queries. This violates the principle of immutability of data after the settling time has elapsed.

A variety of policies can be used to determine what the settling time should be and enforce it, but the concept suffers from some fundamental flaws.

One issue is that transactional inserts are slowed by having to wait for the end of the settling time, which may be relatively long. Additionally, establishing a reasonable settling time may be essentially impractical in a partitioned network for the following reasons:

In a partitioned network, each part of the network is independent and out of communication with the other; therefore, data may diverge over time. When the partitions are reconnected and the data synchronized, data older than the settling time may be altered. This violates the principle that data should be immutable once the settling time has elapsed.

If the settling time is stopped at the last connected time, no transactional inserts can be done and no transactional queries get any new data.

If the settling time is maintained on one side of the partition, no transactional inserts are possible on the other side of the partition.

Each computer is in its own frame of reference. Pure, classic synchronization between machines is just a commonly agreed upon frame of reference. The settling time approach is an effort to create a "fuzzy" frame of reference, but as soon as it is partitioned or separated from the network, it fails.

Unique Serial Identifiers.

One way to avoid duplicates of insert and delete operations is to issue a unique identifier to each operation. Each computer maintains a list of identifiers of operations processed. If an operation with an identifier in the list arrives, the computer ignores the operation. If the unique identifier is serial, that is, if it increases with each operation, then it can be used to impose a partial query ceiling, as follows:

Label each entry recorded in each computer with the greatest unique serial identifier of any insert operation on the entry.

For queries with unique serial identifiers before that of the label on the entry, ignore the entry.

This prevents an insert after a query starts from being included in the answer to the query. However, this does not prevent a delete after a query starts from affecting the answer to the query. It also introduces a potential error, as follows. Suppose that an entry is in the collection, a query starts, and then the entry is re-inserted. When the query is processed on the entry the query ignores the entry because the entry label is after the query identifier. Another potential shortcoming of unique serial identifiers is that they may be issued from a single site to ensure they are unique and serial, which causes a bottleneck because each operation must access the single site before proceeding.

Timestamps.

The data store may label each operation with a timestamp, indicating the time at which the operation began. Timestamps are non-unique serial identifiers. They can be issued locally, avoiding the problem of all operations having to access a single site. However, they introduce the issue of ties, in which multiple operations begin at the same time according to different computers that issue the timestamps.

Orderstamps.

The data store may label each operation with an approximate timestamp that is also a unique serial identifier. Such a label is referred to as an orderstamp. One way to create an orderstamp is to encode the time at which an operation begins in the high-order bits of a label and encode a unique identifier corresponding to the computer at which the operation begins in the low-order bits. The same time zone should be used to produce the time on all computers in the system. Then orderstamps can be compared to determine, up to the accuracy of clock skew among processors, the order in which operations began.

It would be advantageous to provide a system and method for providing consistency and immutability across a distributed data network. As well, it would be advantageous to provide a system and method for providing consistency and immutability for transactional operations across a distributed data network.

In addition, it would be advantageous to provide a system and method for providing consistency and immutability for transactional operations across a distributed data store having a plurality of partitions. Furthermore it would be advantageous to provide a system and method for providing consistency and immutability for operational transactions, while allowing non-transactional operations to proceed at a local computer.

SUMMARY OF THE INVENTION

One machine, i.e. computer, on a network, such as associated with a distributed database, e.g. a data store or a partition thereof, is designated as a master, which alone can issue system orderstamps for transactional operations, while other machines associated with the data store or partition thereof act as any of clients that submit transactions to the master, or as slaves that adhere to updates from the master. If a transactional operation on the distributed database is attempted on a client machine, and communication cannot be established with the master machine, the transaction fails. The distributed data store having such a master provides a method that decreases transaction time across the distributed database, and maintains consistent data between separate machines.

BRIEF DESCRIPTION OF THE DRAWINGS

FIG. 16 is a first exemplary view of operations upon a data collection process in a distributed data store system having a designated master computer; and FIG. 17 is a second exemplary view of operations upon a data collection process in a distributed data store system having a designated master computer.

DETAILED DESCRIPTION OF THE INVENTION

Figure 1:
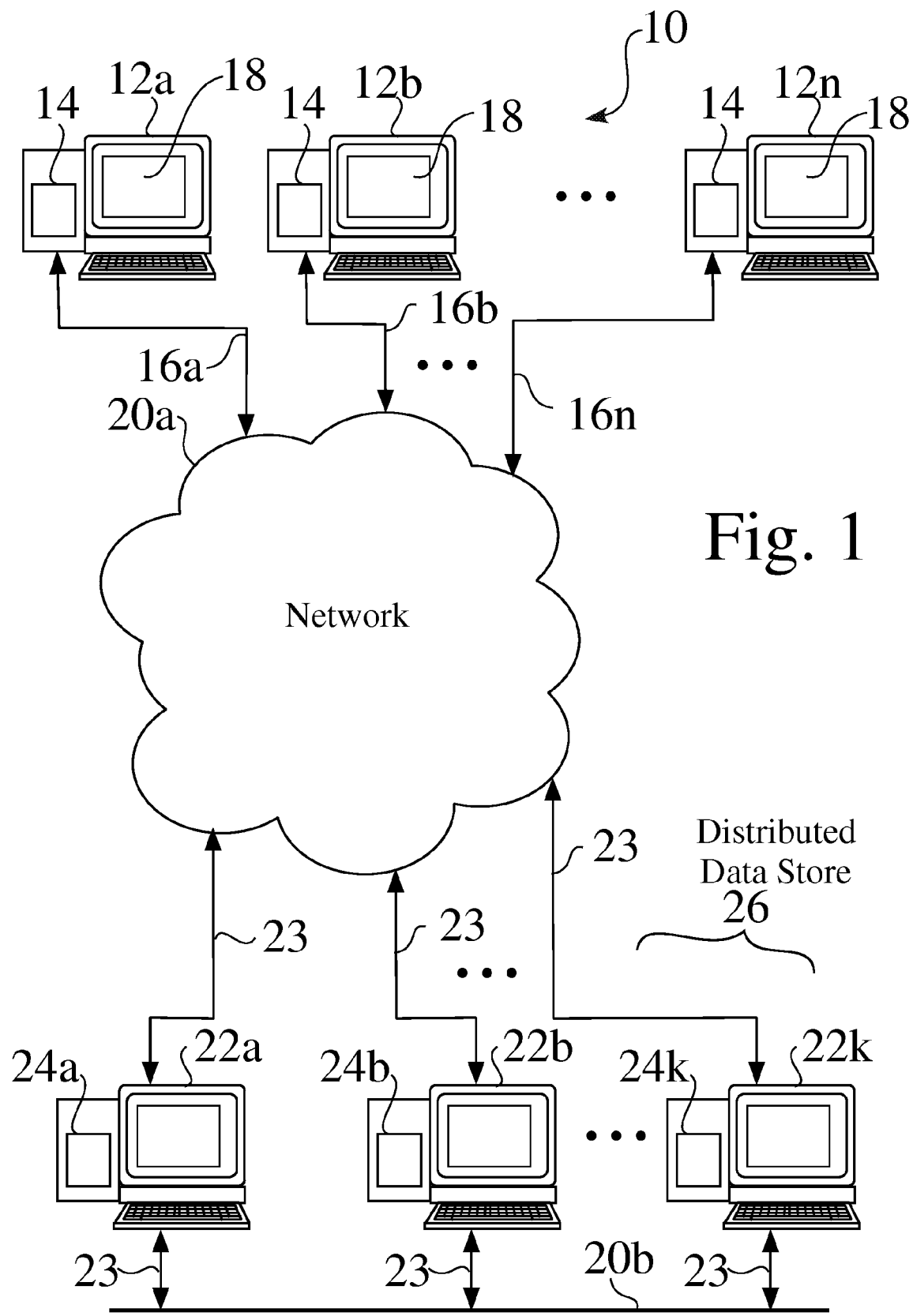
FIG. 1 is a schematic diagram of a distributed data store implemented across a network, wherein one or more computers are connectable to at least a portion of the distributed data store.

FIG. 1 is a schematic diagram 10 of a distributed data store 26 implemented across a network 20, wherein one or more computers 12, e.g. 12a-12n, are connectable to at least a portion of the distributed data store 26. The exemplary computers 12, e.g. 12a, shown in FIG. 1 typically comprise a processor 14 and a user interface 18, and are connectable 16, e.g. 16a, to the distributed data store 26, such as through a network 20a.

A data store 26 is distributed among a number of physical locations 22, e.g. machines or computers 22a-22k connected 23 through a data network 20, e.g. such as but not limited to a data network 20a through which other computers 12 are connectable to the data store 26, or through a dedicated network 20b.

A particular machine 22 may maintain a complete or partial copy of the data store 26. When a transaction takes place on or through a particular machine 22, the data in the store 26 may be altered as a result. This data must be updated across all machines 22 housing it, or inconsistent data will result.

Figure 2:
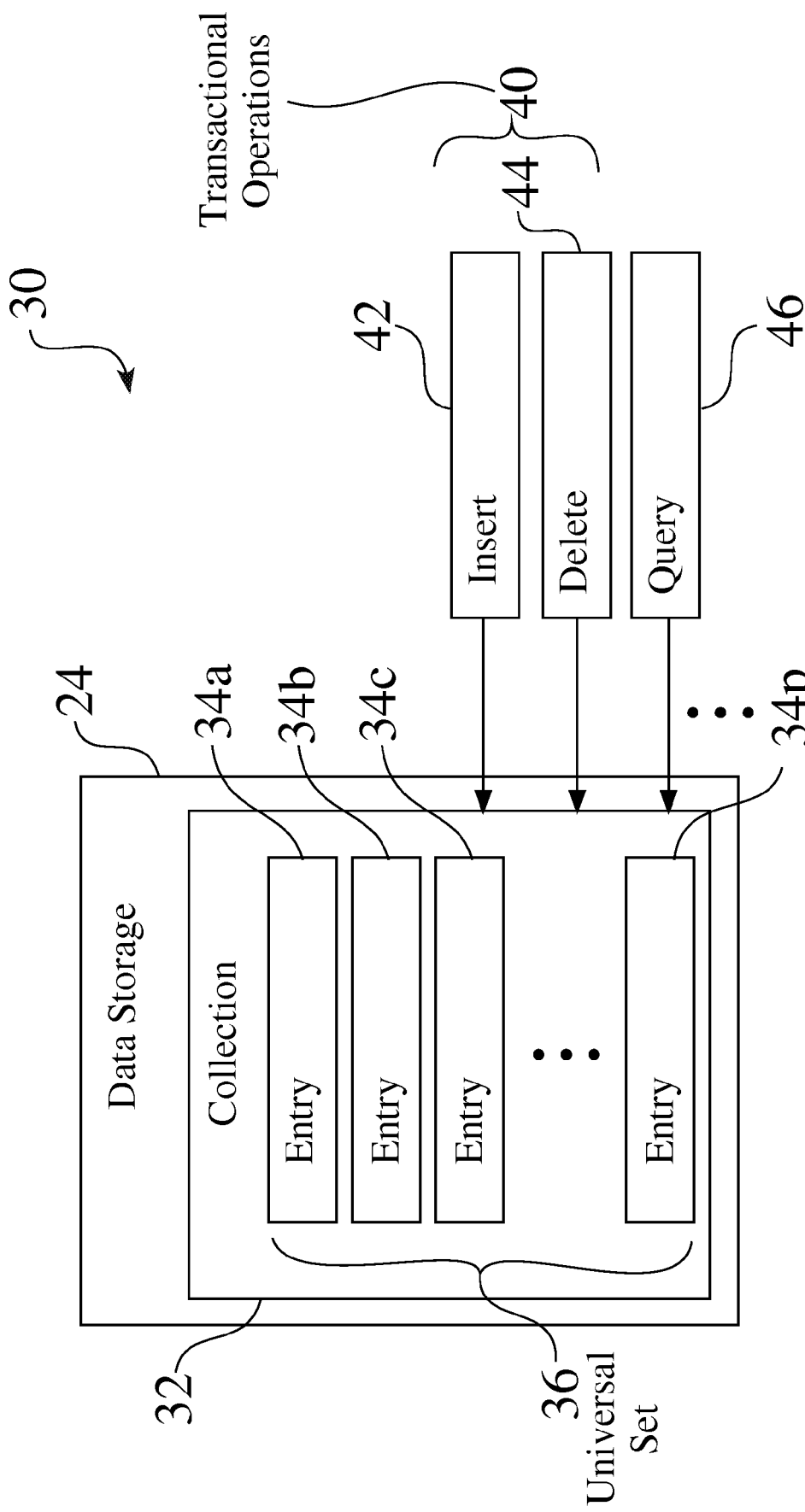
FIG. 2 shows an exemplary collection of entries within a data storage, and exemplary operations made upon the collection.

FIG. 2 is a schematic diagram 30 of an exemplary collection 32 of entries 34, e.g. 34a-34p, within a data storage 24, wherein exemplary transactional operations 40 may be made upon the collection 32, such as comprising any of insert operations 42 and delete operations 44. Transactional operations 40 may initially be requested through a computer 12, e.g. 12a-12n (FIG. 1), such as by a user USR (FIG. 3), or may be initiated through one of the machines or computers 22 that is part of the distributed data store 26. As well, query operations 46 may be made upon the collection 32.

Figure 3:
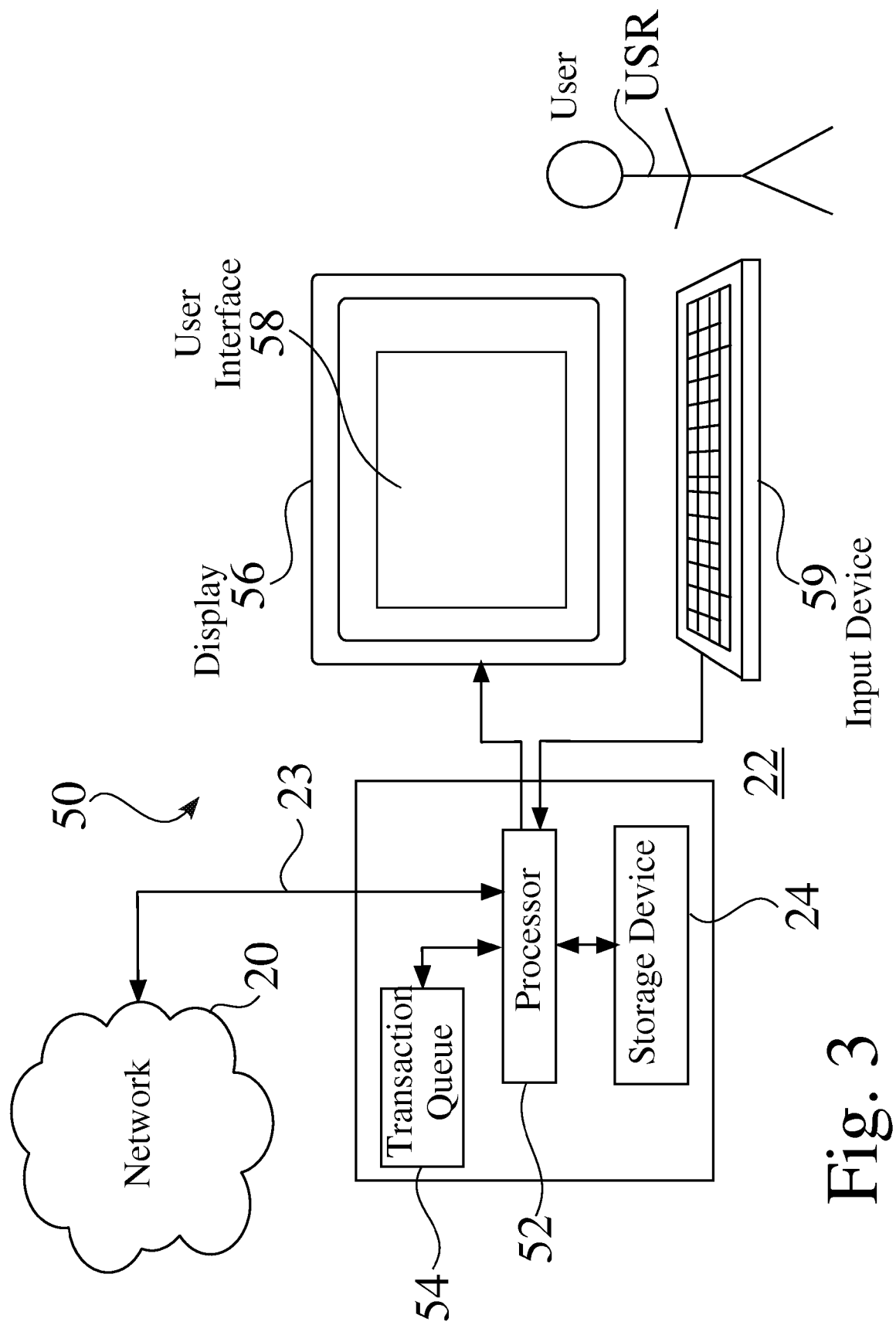
FIG. 3 is a schematic diagram of an exemplary computer associated with an enhanced distributed data store system having a designated master to ensure consistency.
Figure 4:
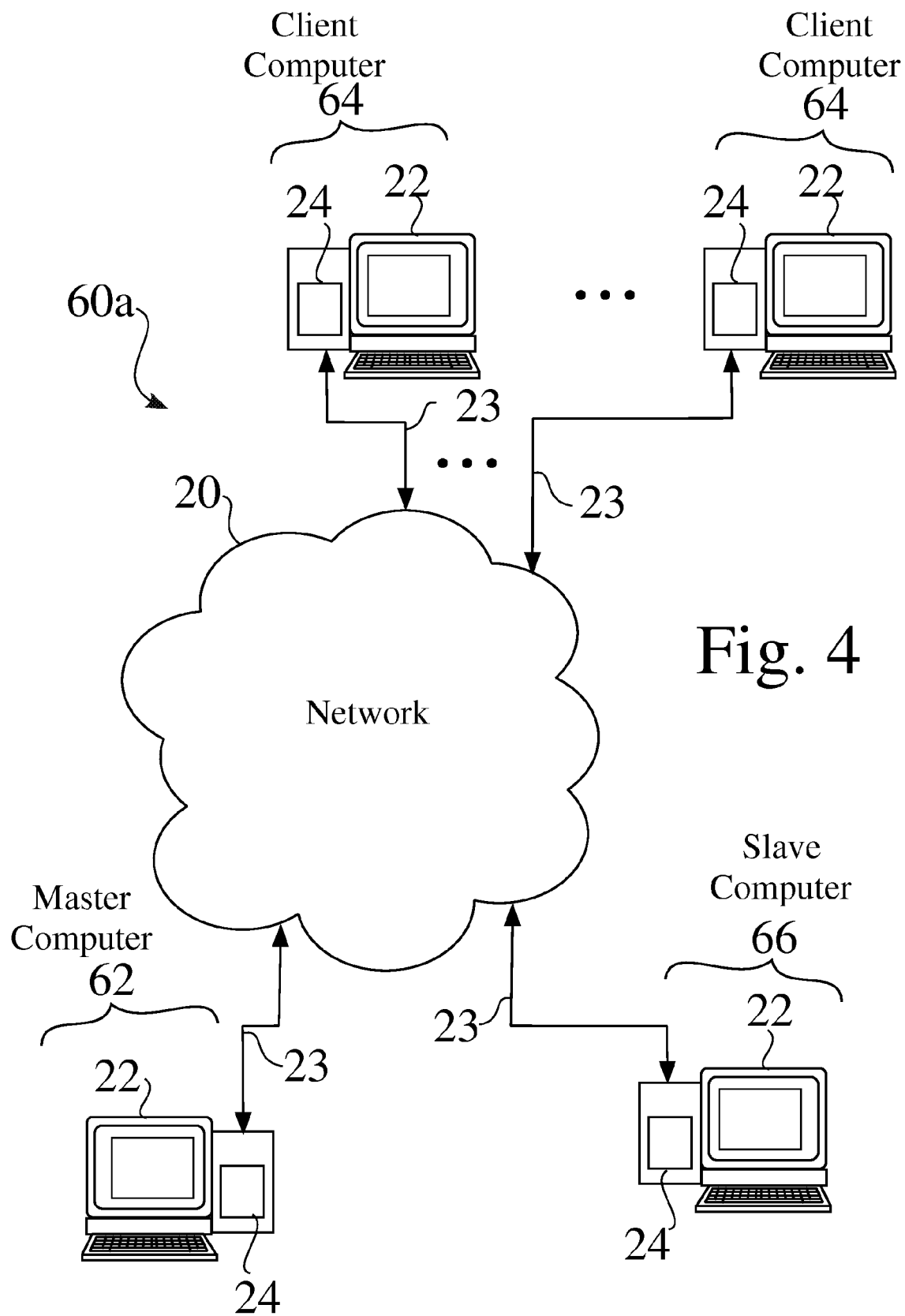
FIG. 4 is a schematic diagram of a distributed data store with a designated master computer to ensure consistency.
Figure 9:
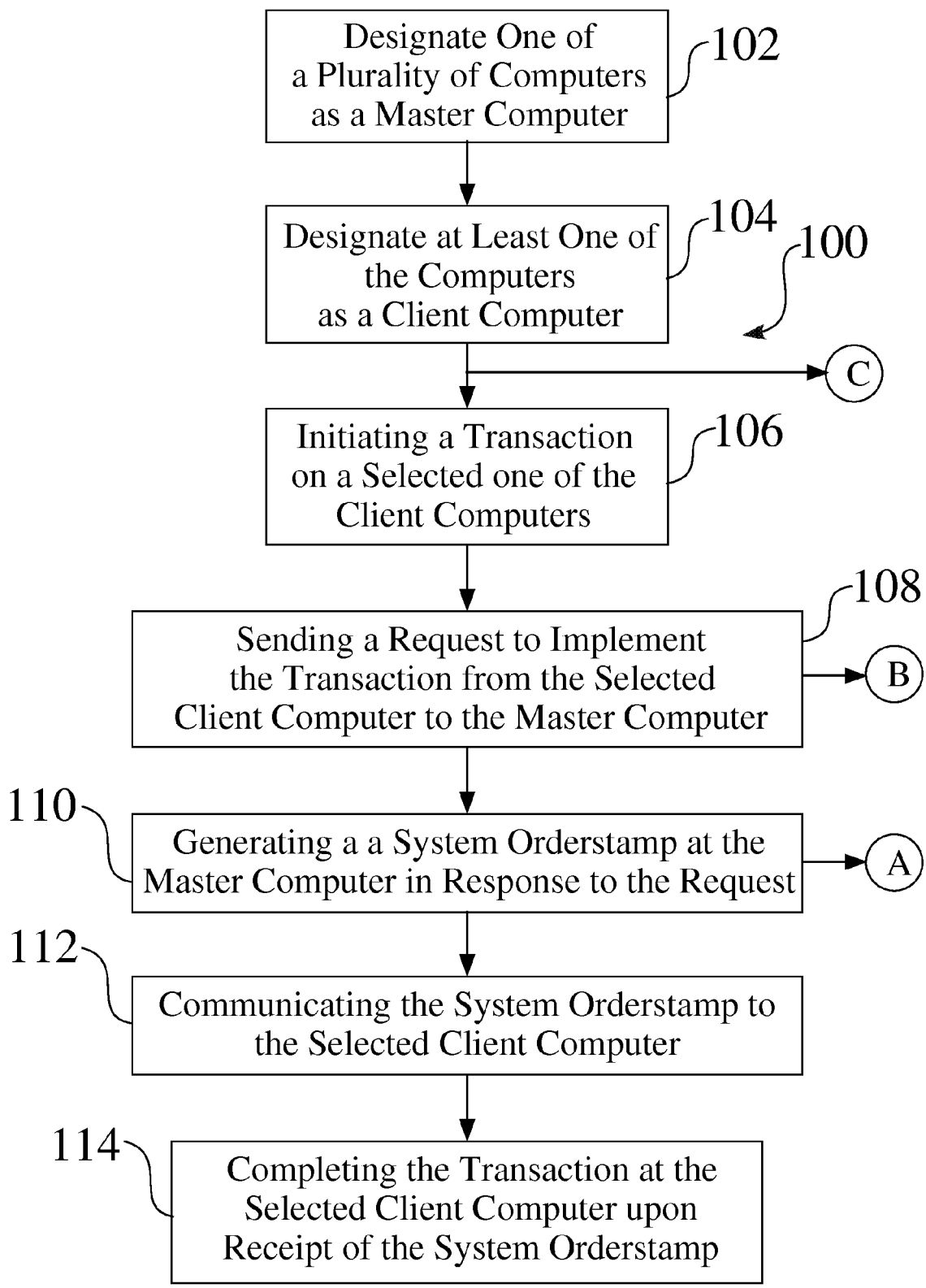
FIG. 9 is a flowchart of an exemplary orderstamp process in a distributed data store system having a designated master computer.

FIG. 3 is a schematic diagram 50 of an exemplary computer 22 associated with an enhanced digital data store system 60 (FIGS. 4-6) and process 100 (FIG. 9). As seen in FIG. 3, a processor 52 is connectable to a storage device 24, and is also connectable 23 to a network 20. The computer 22 may preferably comprise a display 56, a user interface 58, and an input device 59, such as but not limited to a keyboard, a mouse, a touch screen, or a touch pad. The computer 22 may also comprise a transaction queue 54, such as to retain identification of requested or pending transactional operations 40 at either an originating client machine 64 or a master machine 62 (FIG. 4).

The latter is a specified machine 22 on the network designated as the master machine 62. Only the master machine 62 can issue system orderstamps 90, which are necessary for each transactional operation 40. A single master 62 may be designated for the entire distributed data store 26, or alternatively one for each partition 76 (see FIG. 6) of the distributed data store 26.

Figure 8:
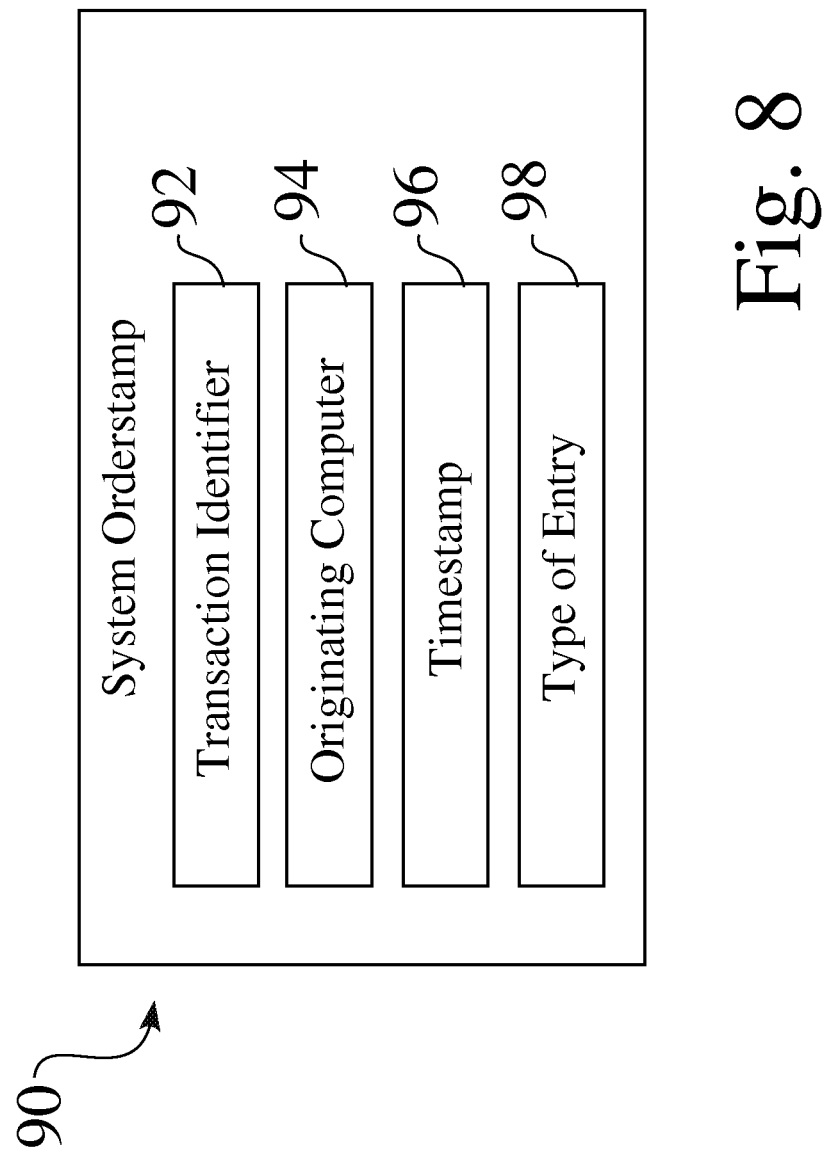
FIG. 8 is a schematic block diagram of an exemplary system orderstamp issued by a designated master computer.

A transactional operation 40 is an operation that depends upon consistent information across the data store 26, e.g. data that is immutable once the settling time has passed. For example, a withdrawal request might rely on a given bank balance being present at a given time and date, and that balance as of that time should not be retroactively altered because of late-arriving data received from elsewhere. In the described invention, a transactional operation 40 such as this will not succeed if the specified subset of the universal set has been modified since the operation's system orderstamp 90 (FIG. 8).

In contrast, a non-transactional operation 152 (FIG. 14) relies on data inherently immutable to change regardless of alterations to any other data. For example, a temperature sensor 158 (FIG. 14) may read the temperature at 2 PM in a given location as 30 degrees Celsius, and that temperature data is immutable and not affected by temperature readings in other locations. In this invention, a system orderstamp is not necessary for this type of operation.

Figure 5:
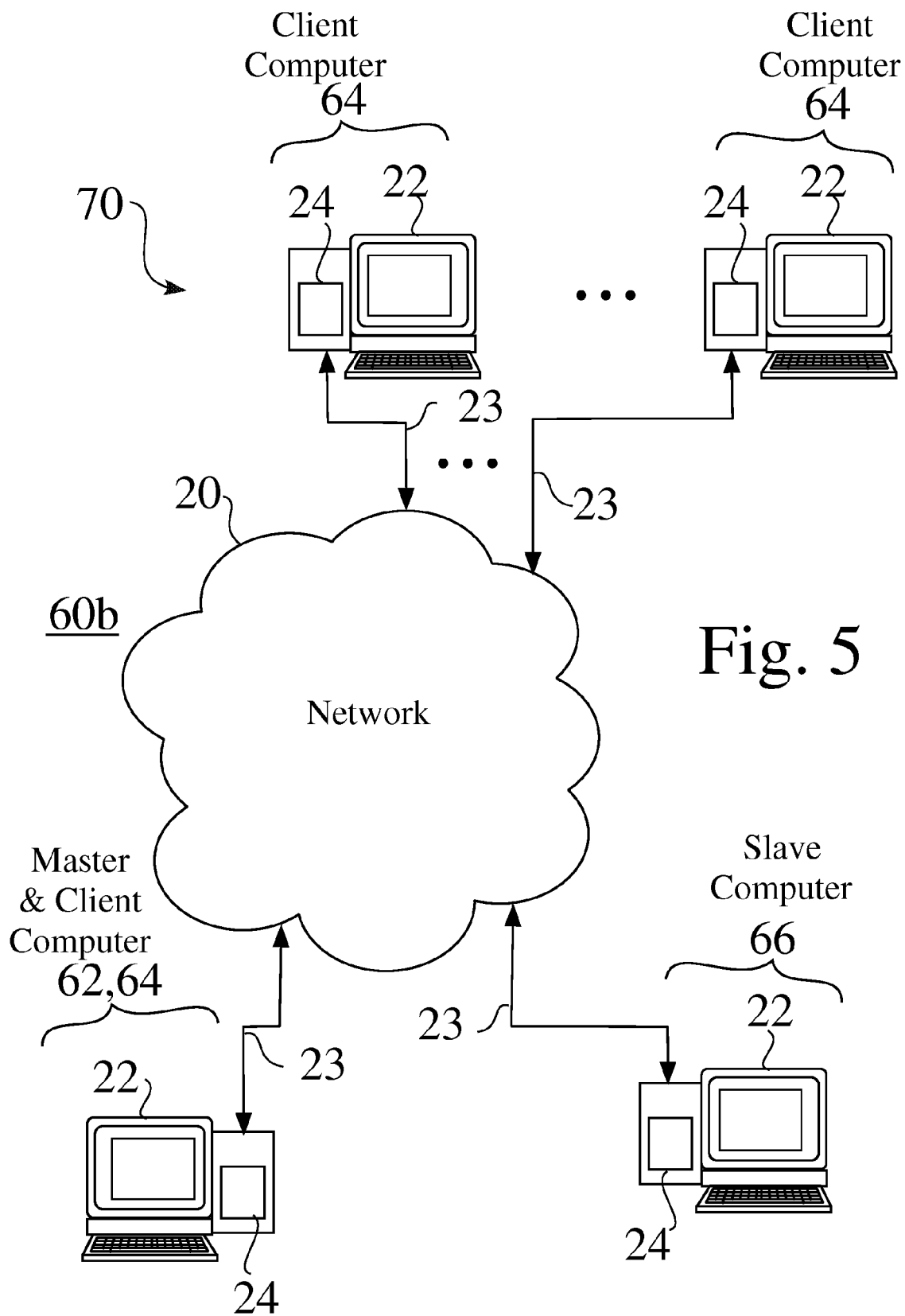
FIG. 5 is a schematic diagram of a distributed data store with a designated master computer to ensure consistency, wherein the master computer may preferably additionally act as a client computer.
Figure 6:
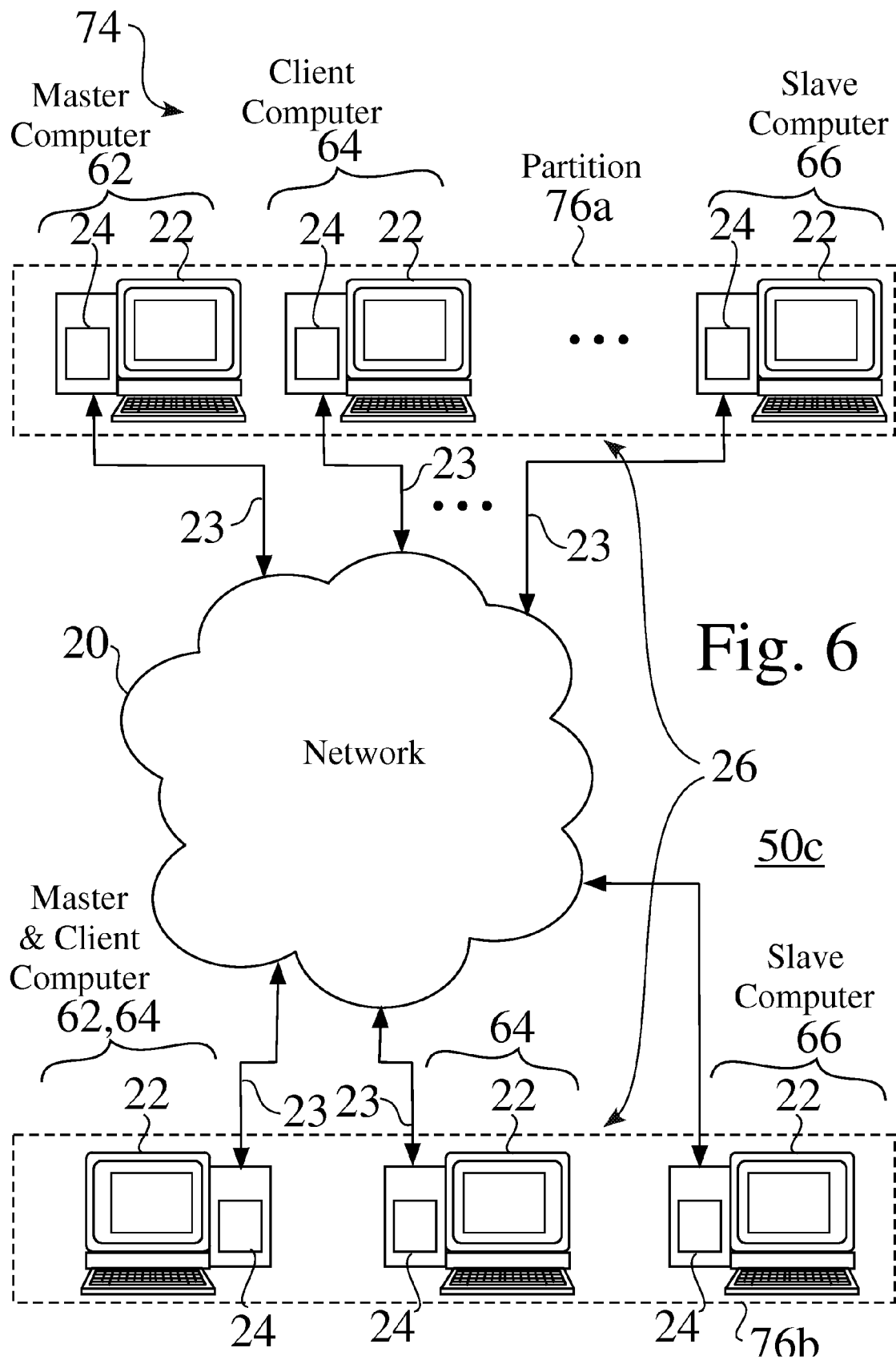
FIG. 6 is a schematic diagram of a distributed data store having a plurality of partitions, wherein each partition has a designated master computer to ensure consistency across its respective partition.

FIG. 4 is a schematic diagram of an exemplary distributed data store system 60a with a designated master computer 62 to ensure consistency. FIG. 5 is a schematic diagram of an alternate exemplary distributed data store system 60b having a designated master computer 62 to ensure consistency, wherein the master computer 62 may preferably additionally act as a client computer 64, e.g. a computer 22 wherein a transactional operation 40 is initiated. FIG. 6 is a schematic diagram of an exemplary distributed data store system 60c having a plurality of partitions 76, e.g. 76a,76b, wherein each partition 76 has a designated master computer 62 to ensure consistency across its respective partition 76.

In some embodiments of the distributed data store system 60, one or more computers 22 may act as client computers 64, and may have different levels of security or access. For example, in some system embodiments, only an authenticated user USR may initiate a transactional operation 40 and/or a non-transactional operation 152 through a given client machine 64. As well, in some system embodiments, an authenticated user USR may initiate a transactional operation 40, while any of an authenticated or an anonymous user USR may be allowed to initiate a non-transactional operation 152.

In most embodiments of the distributed data store system 60 and associated process 100, non-transactional operations 152 (FIG. 14), e.g. inserts, deletes or queries, are possible at the local level, e.g. through any associated computer 12,22, without centralized approval, i.e. without a system orderstamp 90, since it is not important to have a common frame of reference for non-transactional operations 152.

Figure 7:
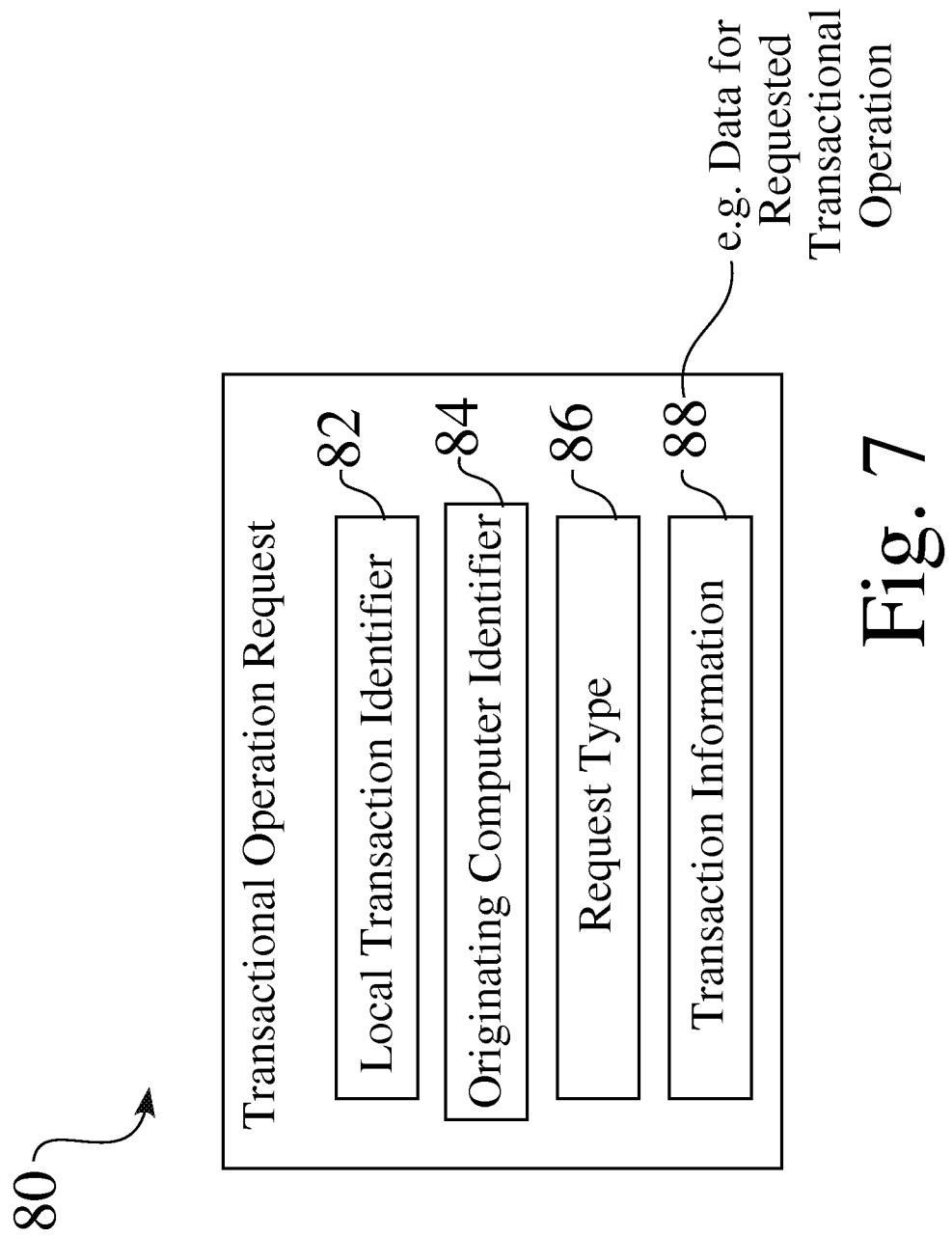
FIG. 7 is a schematic block diagram of an exemplary transactional operation request sent by an originating computer to a designated master computer.

FIG. 7 is a schematic diagram of an exemplary transactional operation request 80 that is sent by an originating computer 64 to a designated master computer 62. The request 80 may preferably comprise any of a local transaction identifier 82, an originating computer identifier 84, a request type identifier 86, e.g. an insert request or a delete request, and/or transaction information 88, such as but not limited to data required for a requested insert entry 42 or a delete entry 44.

FIG. 8 is a schematic block diagram of an exemplary system orderstamp 90 issued by a designated master computer 62, such as in response to a received transactional operation request 80 that is sent to the master computer 62 from an originating client computer 64. Transactional operations 40 on the data store 26 are labeled with system orderstamps 90, which comprise unique centralized identifiers that record the time 96 and machine 94 on which an operation took place.

A system orderstamp 90 that is issued by a designated master computer 62 is distinguished from a local or temporary orderstamp 160 (FIG. 15) that can be issued by any computer 22 associated with the data store 26, e.g. a client computer 64. The system orderstamp 90 typically comprises a timestamp 96 and an identification 94 of the originating computer 64, and may also comprise any of a transaction identifier 92 and an entry type identifier 98. A system orderstamp 90 may also comprise other information to be distributed to other client computers 64 or to slave computers 66, such as transaction information or data that may be necessary to carry out the transactional operation 40 at other members of a data store 26 or partition 76 thereof.

In some system embodiments, an exemplary orderable and unique system orderstamp 90 may comprise the following format:

MA-0001-12:30:17-08152009 . . . ;

wherein "MA" identifies the orderstamp as being issued from a designated master computer 62, "0001" is a unique identifier 92, "12:30:17-08152009 comprises a timestamp 96, e.g. corresponding to a time of 12:30:17 hours on 15 Aug. 2009, as stamped by the master computer 62.

In some system embodiments 60, a designated master machine 62 is not required to approve all transactional requests 40 that are received. For example, an approval of a requested delete operation that constitutes a withdrawal from a financial account may be controllable through the master computer 62. However, such a master computer 62 typically provides a system orderstamp 90 upon its approval of a transactional request 80.

The storage and retrieval of system orderstamps 90 enable a recorded history of transactional operations to be retrieved, such as to properly rank and order the transactions 40.

FIG. 9 is a flowchart of an exemplary orderstamp process 100 in a distributed data store system 60 having a designated master computer 62. As seen in FIG. 9, some embodiments of the process 100 may include a step 102 of designating a computer 22 as a master computer 62, such as for an entire distributed data store 26, or for an associated partition 76. Such a designation 102 may be accomplished by any of a wide variety of methods, such as but not limited to a designation or selection by a user, a designation by an external administrator, an automated designation, a designation based on system architecture, or a random designation.

While some embodiments of the process 100 may allow any computer 22 to operate as a client machine 64, through which transactional operations 40 are initiated 106, other embodiments of the process 100 may include a step 104 for designating or otherwise establishing at least one computer 22 associated with the data store 26 as a client computer 64.

As further seen in FIG. 9, a transactional operation 40 is typically initiated 106 at one of the computers 22, such as at a selected one of the client computers 64. Upon initiation 106, a transactional operation request 80 (FIG. 7) is prepared and sent from the initiating machine, i.e. the selected client computer 64, to the designated master computer 62, such as over the network 20.

In response to a transactional operation request 80 that is received at the designated master computer 62, the system orderstamp 90 is typically generated 110 at the designated master computer 62. Upon receipt at the designated master computer 62, the transactional operation request 80 may be stored, at least temporarily, in a transaction queue 54 (FIG. 3), such as until the processor 52 at the designated master computer 62 is able to process the transactional operation request 80 and generate 110 a system orderstamp 90.

After the system orderstamp 90 is generated 110 at the designated master computer 62, the system orderstamp 90 is then typically sent 112 from the designated master computer 62 to the originating client computer 62. As well, the system orderstamp 110 and/or updated data may preferably be sent 122 (FIG. 10) to other related computers 62,66 in the distributed data store 26, or partition 76 thereof, which store a copy of the corresponding data volume 32, i.e. tile or collection 32, such that the change defined by the approved transactional operation 40 is implemented at all machines 22 that provide a copy of the associated data volume 32.

Once the system orderstamp 90 is received at the originating client computer 64, and/or at a related computer 64,66 associated with the data store 26, the requested transaction 40 is typically completed 114. For example, upon receipt of the system orderstamp 90 at the originating client computer 64, and/or at a related computer 64,66 associated with the data store 26, the system orderstamp 90 may be stored, at least temporarily, in a transaction queue 54, such as until the processor 52 at client computer 64 or slave computer 64 is able to process the system orderstamp 90 and complete 114 the transactional operation 40.

Figure 10:
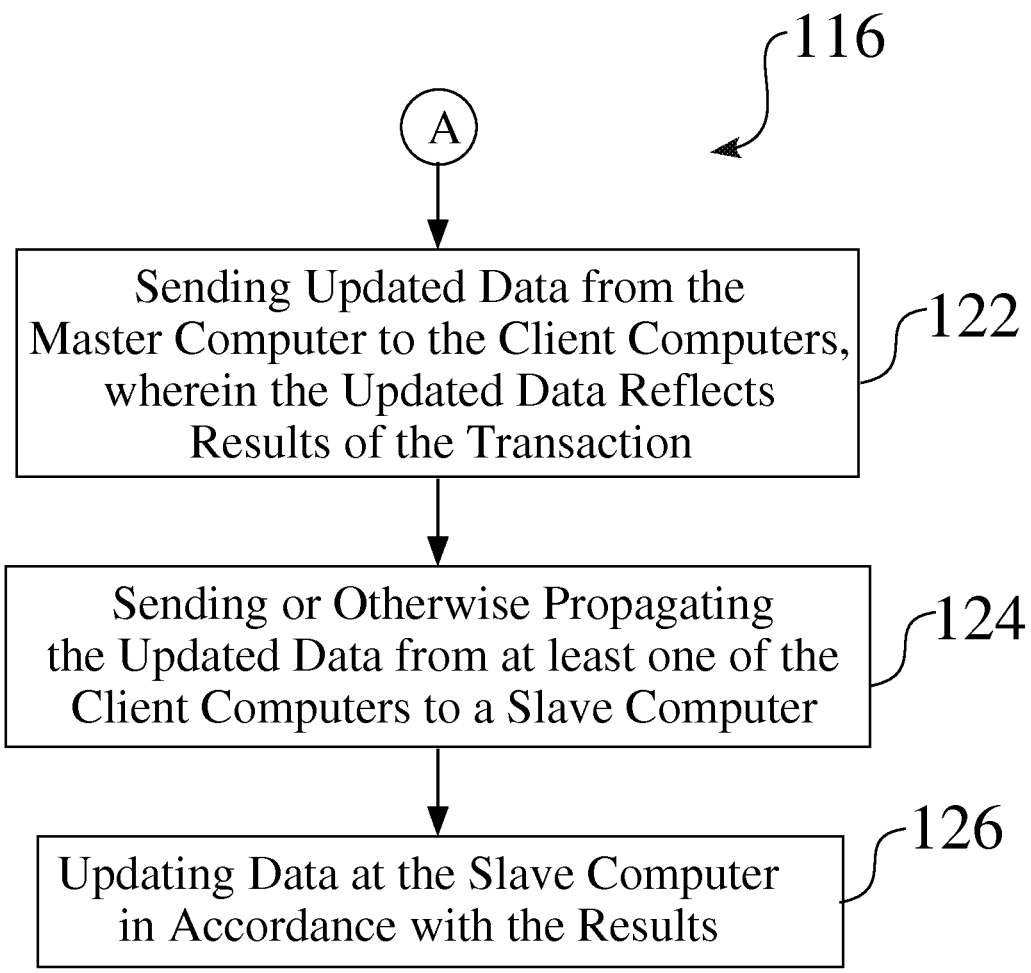
FIG. 10 shows exemplary propagation of updated data in a distributed data store system having a designated master computer.

FIG. 10 shows exemplary propagation 116 of updated data in a distributed data store system 60 having a designated master computer 62. The designated master computer 62 may typically send 122 the system orderstamp 90 and/or updated data to one or more client computers 64, wherein the updated data reflects the results of the requested and approved transactional operation 40. In some system embodiments 60, the system orderstamp 90 and/or updated data is sent 122 from the designated master computer 62 directly to client computers 64 and/or slave machines 66. In other system embodiments 60, the system orderstamp 90 and/or updated data is sent 122 from the designated master computer 62 to one or more of client computers 64, such that the process 100 may further comprise a step of sending or otherwise propagating 124 the system orderstamp 90 and/or updated data from at least one of the receiving client computers 64 to one or more slave computers 66, wherein the data is updated 126 at the slave computers 66, e.g. in accordance with the results of the requested and approved transactional operation 40.

The system orderstamp 90 and/or updated data may be stored at the client computers 64 and/or slave computers 66, at least temporarily, in a transaction queue 54, such as until a processor 52 at the client computers 64 or slave computers 64 are able to process the system orderstamp 90 and complete 126 the transactional operation 40.

Figure 11:
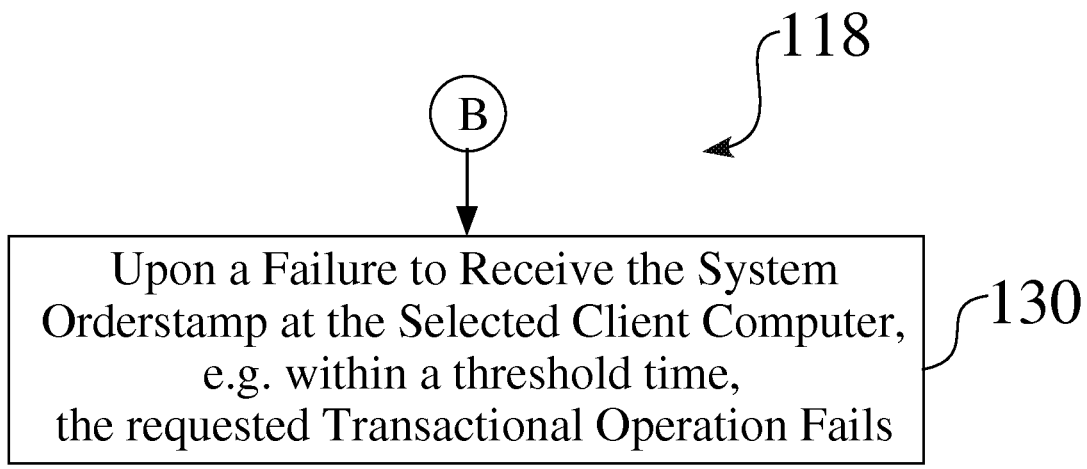
FIG. 11 shows exemplary actions at a selected computer if a system orderstamp is not received from a designated master computer.

FIG. 11 shows exemplary actions 118 of the process 100 at a selected computer 64 if an orderstamp is not received from a designated master computer 62. As shown in FIG. 11, upon a failure to receive a system orderstamp 90 at a selected client computer 64, such as within a threshold time, or if the requested transactional operation is declined through the designated master computer 62, the requested transactional operation 130 typically fails 130 at the selected client computer 64, e.g. wherein the requested transactional operation is not allowed to proceed.

Figure 12:
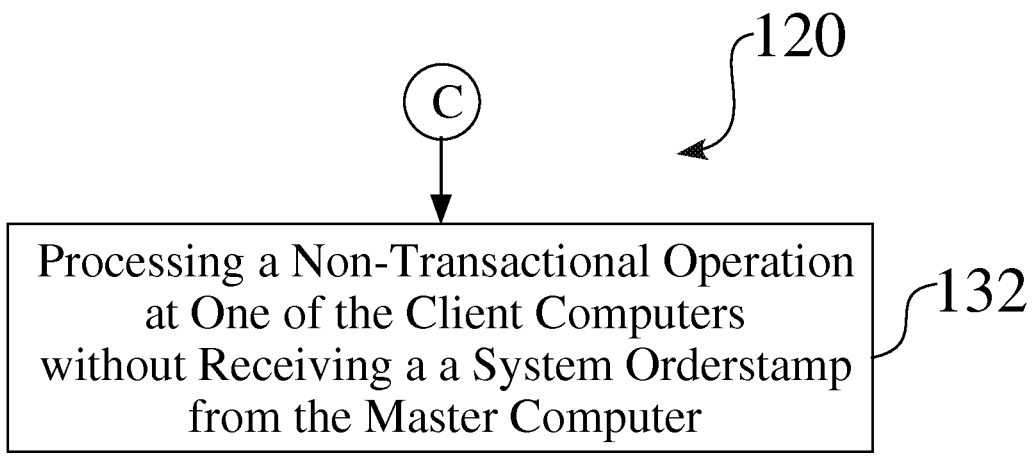
FIG. 12 shows exemplary processing of a non-transactional operation at a selected computer, without a system orderstamp from a designated master computer.
Figure 14:
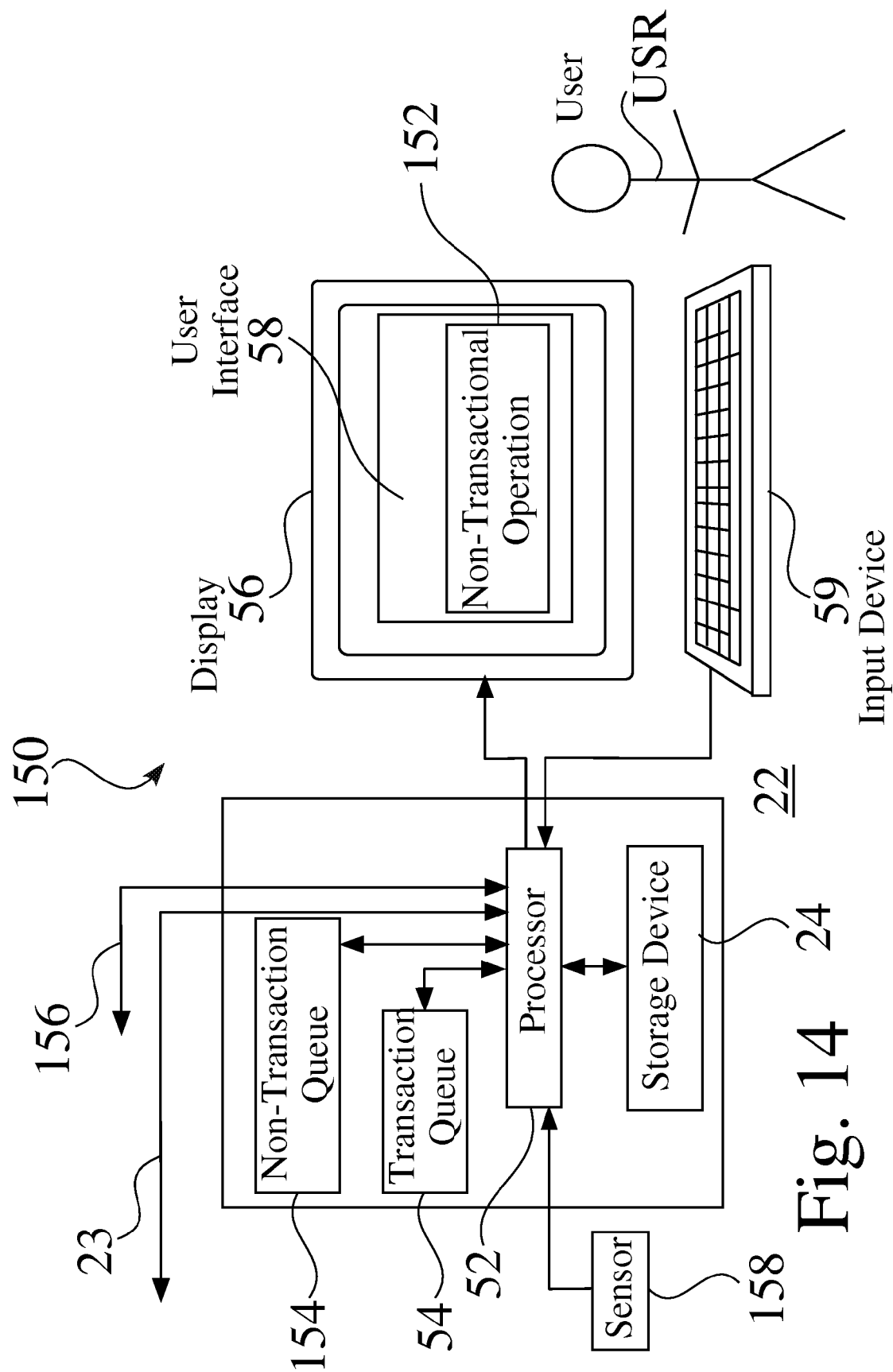
FIG. 14 is a schematic diagram of a non-transactional operation initiated on an exemplary computer associated with a distributed data store system and process.

FIG. 12 shows exemplary processing 120 of a non-transactional operation 152 at a selected computer 64, without a system orderstamp 90 from a designated master computer 62. As shown in FIG. 12, a client computer 64 may preferably initiate and process 132 a non-transactional operation 152 (FIG. 14).

Figure 13:
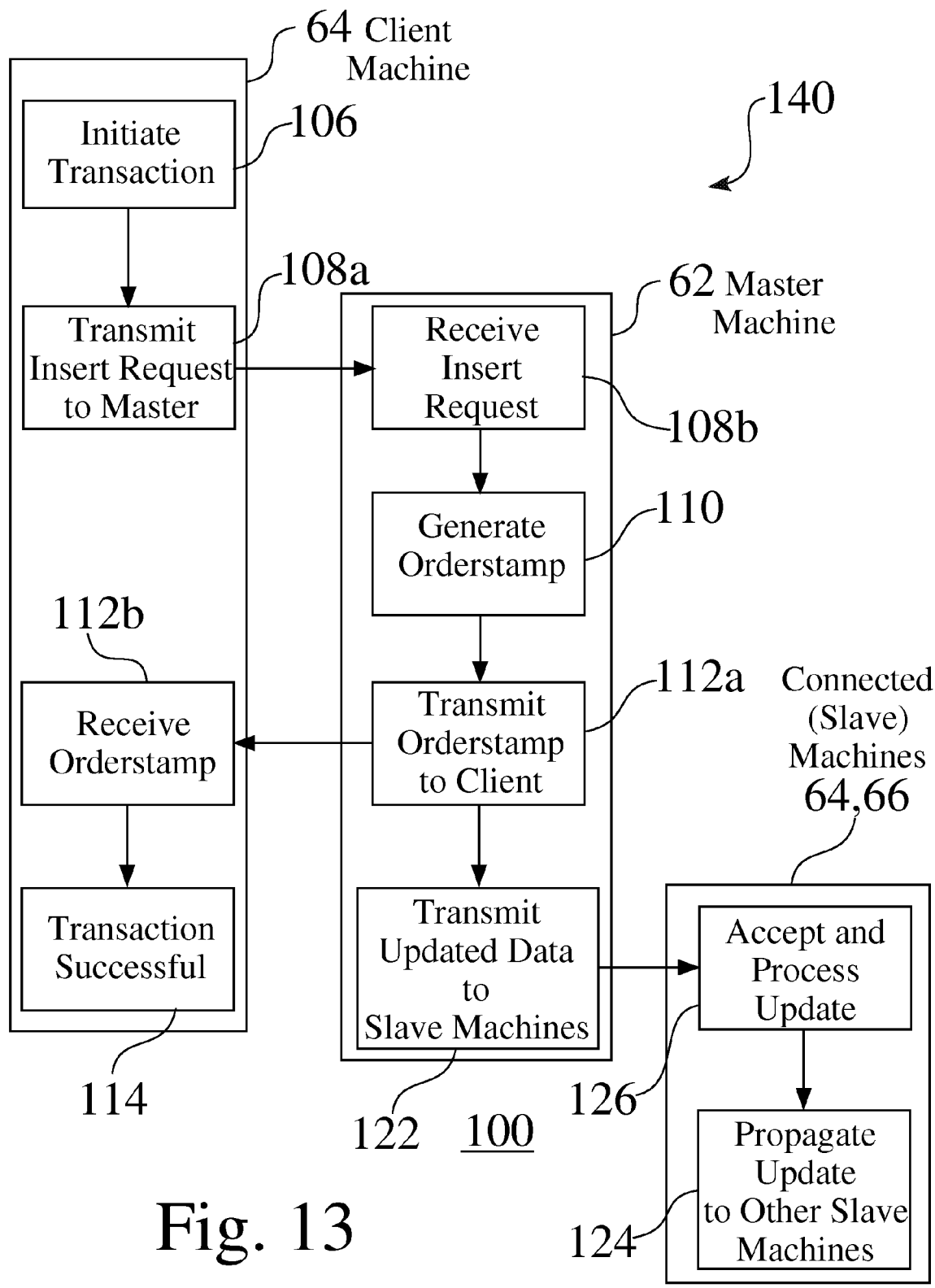
FIG. 13 shows an exemplary block diagram showing interactions between a client machine, a master computer, and a slave machine, in a distributed data store system having a designated master computer.

FIG. 13 depicts an exemplary sequence of steps 140 for a transactional operation 40 within a distributed data store system 60 having a designated master computer 62. When a user USR initiates 106 a transaction 40 on a client machine 64, the client machine 64 attempts to communicate 108a with the master machine 62, such as by sending a transactional operation request 80, e.g. an insert request or a delete request. If the communication is successful 108b, the master machine 62 typically issues a system orderstamp 90, which comprises a globally unique identifier 94 labeling the transactional operation 40.

The master machine 62 then updates the data across the distributed data store 26 to any other connected machines with the affected data the 32, e.g. volume or collection. Connected machines 22 that adhere to the updates 122 from the master 62 are known as slave machines 66. Updates 122 may be sent by any of:

directly from the master machine 62 to slave machines 66;
propagated from slave machine 66 to slave machine 66; or
a combination of the two.

However, if the client machine 64 cannot establish communication with the master machine 62, a system orderstamp 90 is not received at the originating client machine 64, and the transactional operation 40 is rejected 130 (FIG. 11) or queued 54. In most system embodiments, 60, no subsequent transactional operation 40 on that tile 32 may take place until communication is established and system orderstamps 90 are received for such queued transactions 40.

The process 100 associated with the distributed data store system 60 having a designated master computer 62 ensures the immutability of data before the last system orderstamp 90 for a data volume, i.e. tile 32. Since only the master machine 62 can issue system orderstamps 90, a data volume 32 and entries 36 are prevented from being retroactively altered, since the system 60 and process prevents transactions 40 that are belatedly received from other sources, e.g. client machines 64, at a later time.

Additionally, as long as the originating client machine 64 is in communication with the master machine 62, transactions 40 are quickly handled, with no need for a lengthy settling time for updates to arrive from other connected machines 22.

Figure 15:
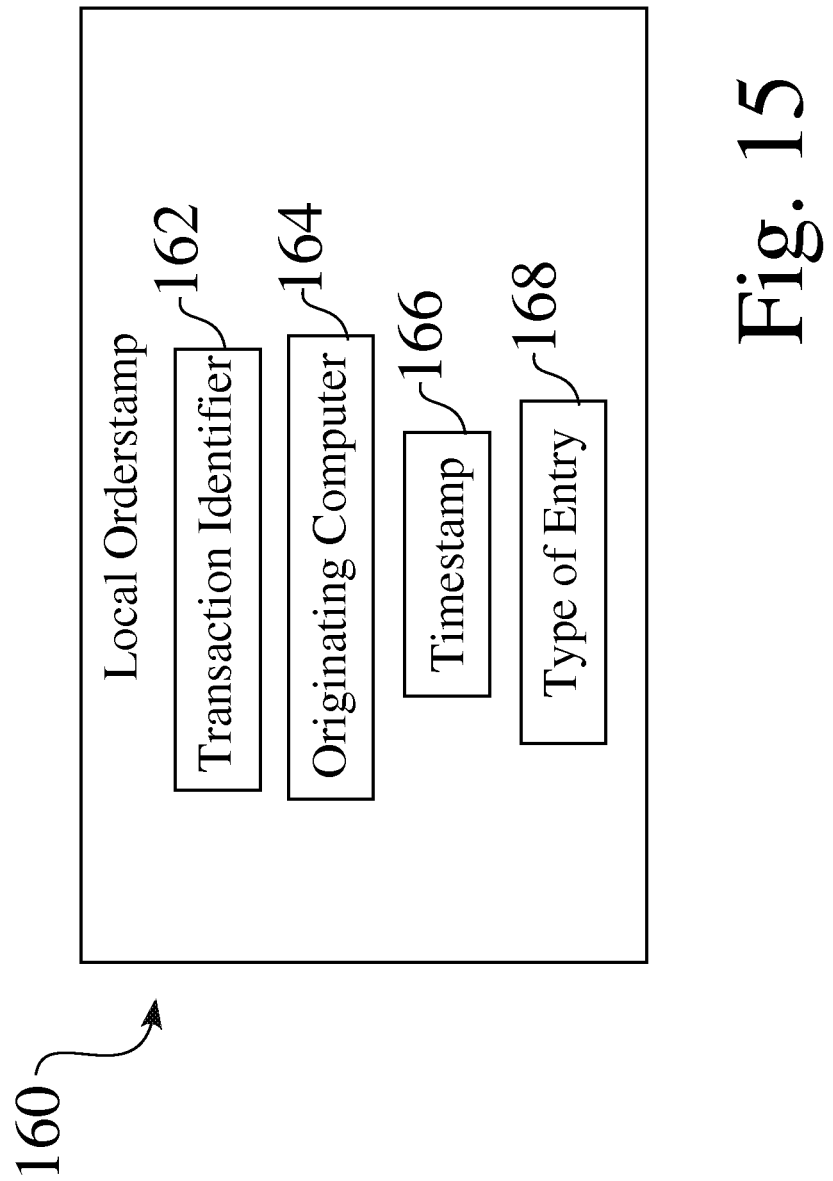
FIG. 15 is a schematic block diagram of an exemplary local orderstamp issued by a client computer, such as for a non-transactional operation.

FIG. 14 is a schematic diagram 150 of a non-transactional operation 152 initiated on an exemplary computer 22, e.g. a client machine 64, that is associated with a digital data store system 60 and process 100. FIG. 15 is a schematic block diagram of an exemplary local or temporary orderstamp 160 issued by a client computer 64, such as for a non-transactional operation 152.

Non-transactional operations 152, e.g. such as but not limited to queries 46, may preferably proceed without receiving system orderstamps 90 from the master machine 62. Non-transactional operations 152 may take place immediately on the local data store 24, such as upon receiving a local or temporary orderstamp 160.

In most embodiments of the distributed data store system 60 and associated process 100, non-transactional operations 152, e.g. inserts, deletes or queries, are possible at the local level, e.g. through any associated computer 12,22, without central approval, i.e. without a system orderstamp 90, since it is not typically important to have a common frame of reference for non-transactional operations 152.

In some embodiments of the distributed data store system 60 and process 100, non-transactional operations 152 may also be sent to the master machine 62, such as within a request 80. If communications are not established, they are queued 154 for later transmission. The nature of the operations, whether for transactional operations 40 or non-transactional operations 152, is typically specified in the request 80, e.g. for an insert or delete request 80.

In some system embodiments 60, a local client machine 64 may consider a transactional operation 40, at least temporarily, as a non-transactional operation 152, such as for local updates, control and/or reporting. For example, in an industrial process control environment, a local machine 64 may be required to provide local control and data storage for a process while providing trending data to an offsite master computer 62. In such a situation, the local computer 64 may preferably log data and provide local control for a process, even if communication with a master computer 62 is temporarily interrupted. While such an environment may preferably allow control through the designated master computer 62 through transactional operations 40 requested by a local client 64, local or temporary orderstamps 160 may preferably allow transactional operations 40 to be treated as non-transactional operations 152 for some system embodiments 60.

A client machine may therefore preferably create a local or temporary orderstamp 160 to identify a non-transactional operation 152, which may be stored in any of:

the same field as master orderstamps 90, e.g. such as to be replaced after the transaction is processed and issued a master orderstamp 90; or in a different field, e.g. such that, once processed and issued a master orderstamp 90, while the operation 40,152 may preferably be referred to with the master orderstamp 90, wherein at least the local machine 64 may keep a record that refers to the initial, i.e. local, orderstamp 160.

In some system embodiments, an exemplary orderable and unique local orderstamp 160 may comprise a similar but identifiable format to a system orderstamp 90, such as shown:

C3-0015-12:30:17-08152009 . . . ;

wherein "C3" identifies the orderstamp as being issued from a specific client computer 64 of a distributed data store 26, "0015" is a unique local identifier 162, and "12:43:07-08152009" comprises a timestamp 96, e.g. corresponding to a time of 12:43:07 hours on 15 Aug. 2009, as stamped by the local client computer 64.

At the time when a system orderstamp 90 has been issued at the master computer 62, and the master computer 62 has updated storage 24 at the master computer 62, but otherwise the update, e.g. corresponding to the system orderstamp 90, has not yet updated other data, a data query 46 sent to the master computer 62 is based on the consistent and most recent information, while a data query 46 sent to a different storage, e.g. a slave computer 66 or client computer 64, yields consistent, but not yet updated data at the other locations.

In another example, wherein storage of data inserts, e.g. local temp trending, is treated as non-transactional operations, the most recent data has associated local orderstamps 152, and provides local consistency. Before the data is updated through the master computer 62, e.g. with system orderstamps 90, a query 46 sent to the selected client 64 yields the most recent, locally consistent, data, while a similar query 46 sent to the master computer 62 or to other machines in the partition 76, would yield consistent results based on the last transactional operation 40 approved by the master computer 62, which may be older than the newest local data at the originating client computer 64, since the requested transactional operation 40 has not yet been approved by the master computer 62 through issuance and communication of a system orderstamp 90.

As transactional operations upon a data collection 32 for all machines 22 associated with the distributed data store 26 are controlled by a designated master machine 62, i.e. a computer 62, using centralized orderstamps 90 that typically comprise a corresponding timestamp 96 and globally unique identifier 92 issued by the master machine, the data collections 32 for the associated machines 22 inherently correspond to a centralized settling time. As long as communication between the machines 22 is preserved, and the master computer 62 is able to process requests and generate and transmit system orderstamps 90, the transaction time across the distributed data store 26 is decreased.

FIG. 16 is a first exemplary view 180 of operations upon a data collection 32 in a distributed data store system 60 having a designated master computer 62, wherein data consistency to required to provide accurate query results and to prevent a financial account from being overdrawn, such as from multiple withdrawals. FIG. 17 is a second exemplary view 190 of operations upon a data collection 32 in a distributed data store system 60 having a designated master computer 62, allowing deposits and withdrawals, wherein data consistency to required to provide accurate query results and to prevent a financial account from being overdrawn.

As seen in FIG. 16, a data query 46 sent through a second terminal 22, after a first withdrawal of $600.00 but before a second withdrawal of $300.00, shows an available balance of $400.00 at either terminal 22, since the data is consistent through each of the respective data stores 24. Similarly, a data query 46 sent through a second terminal 22, after a deposit of $350.00 but before a withdrawal of $300.00, shows an available balance of $1,350.00 at either terminal 22, since the data is also consistent through each of the respective data stores 24.

The distributed data store system 60 and associated process 100 provides a common point of reference through a designated master computer 62 by which all transactional operations 40 are controlled to inherently ensure consistency and immutability. As well, the distributed data store system 60 and associated process 100 decreases transaction time across the distributed database 26. Settling time can be reduced because the system orderstamp 90 ensures consistent data. Also, work can be more readily partitioned 76, wherein one master computer 62 is designated for each partition 76.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method implemented across a network that is associated with one or more client machines, wherein the method comprises the steps of:
   providing storage of data at a data store that is distributed between a plurality of computers, wherein at least one portion of the data is duplicated across at least two of the plurality of the computers;
   sending a request to implement a transactional operation on the data store, wherein the transactional operation comprises an update of at least a portion of the data in the data store, and wherein the request is sent from a selected client machine to a master machine;
   generating a system orderstamp at the master machine in response to the received request, wherein the orderstamp uniquely identifies the requested transactional operation;
   sending the system orderstamp from the master machine to the selected client machine;
   propagating any of the system orderstamp or updated data from the master machine to each of the plurality of computers at which the data to be updated in response to the requested transactional operation is stored, wherein the updated data reflects results of the requested transactional operation; and
   updating the data store in response to the requested transactional operation;
   wherein the data remains consistent across the data store.

2. The method of claim 1, further comprising the step of:
   designating one of the client machines as the master machine.

3. The method of claim 2, wherein the designation of one of the client machines as the master machine comprises any of a designation by a user, a designation by an external administrator, an automated designation, a designation based on system architecture, or a random designation.

4. The method of claim 1, wherein the master machine and the selected client machine are the same client machine.

5. The method of claim 1, wherein the step of propagating any of the system orderstamp or the updated data from the master machine comprises the steps of:
   propagating the updated data from the master machine computer to any of the client machine or at least one of the other plurality of computers; and
   further propagating the updated data from either the client machine or the at least one of the other plurality of computers to a slave computer, wherein the slave computer comprises one of the plurality of computers at which the data to be updated in response to the requested transactional operation is stored.

6. The method of claim 1, wherein upon failure to receive the system orderstamp at the selected client machine, the requested transactional operation fails.

7. The method of claim 1, further comprising the step of:
   processing a non-transactional operation at one of the plurality of client machines without receiving a system orderstamp from the master machine.

8. The method of claim 7, wherein the step of processing the non-transactional operation comprises the issuance of a local orderstamp at the corresponding client machine.

9. The method of claim 7, wherein the non-transactional operation takes place on a local data store upon receiving any of a local orderstamp or a temporary orderstamp issued by the client machine that corresponds to the local data store.

10. The method of claim 1, wherein the orderstamp further comprises a timestamp.

11. The method of claim 10, wherein the timestamp represents the time that the requested transactional operation originated on the master machine.

12. The method of claim 1, wherein at least a portion of the data store resides on any of the master machine or other connected computers.

13. The method of claim 1, wherein the data store comprises at least two partitions, wherein each of the partitions has a designated master machine.

14. The method of claim 1, wherein the request sent from the selected client machine to the master machine comprises any of a local transaction identifier, an originating computer identifier, a request type identifier, or transaction information.

15. The method of claim 1, wherein the requested transactional operation comprises any of an insert operation or a delete operation.

16. The method of claim 1, wherein if the orderstamp is not received at the selected client machine within a threshold time, the requested transactional operation is not allowed to proceed at the selected client machine.

17. A system implemented across a network that is associated with one or more client machines, wherein the system comprises:
   a data store for storing data, wherein the data store is distributed between a plurality of computers, wherein at least one portion of the data is duplicated across at least two of the plurality of the computers;
   a request to implement a transactional operation on the data store, wherein the transactional operation comprises an update of at least a portion of the data in the data store, and wherein the request is sent from a selected client machine to a master machine;
   a generation of a system orderstamp at the master machine in response to the received request, wherein the orderstamp uniquely identifies the requested transactional operation;
   a transmission of the system orderstamp from the master machine to the selected client machine;
   propagation of any of the system orderstamp or updated data from the master machine to each of the plurality of computers at which the data to be updated in response to the requested transactional operation is stored, wherein the updated data reflects results of the requested transactional operation;
   a mechanism for updating the data store in response to the requested transactional operation;
   wherein the data remains consistent across the data store.

18. The system of claim 17, wherein the master machine and the selected client machine are the same client machine.

19. The system of claim 17, further comprising:
a non-transactional operation processed through one of the client machines without a receipt of a system orderstamp from the master machine.

20. The system of claim 17, wherein the propagation of any of the system orderstamp or updated data from the master machine comprises:
propagation of the updated data from the master machine computer to any of the client machine or at least one of the other plurality of computers; and
propagation of the updated data from either the client machine or the at least one of the other plurality of computers to a slave computer, wherein the slave computer comprises one of the plurality of computers at which the data to be updated in response to the requested transactional operation is stored.

21. The system of claim 17, wherein upon a failure to receive the system orderstamp at the selected client machine, the requested transactional operation fails.

22. The system of claim 17, wherein the requested transactional operation comprises any of an insert operation or a delete operation.

23. The system of claim 17, further comprising:
a threshold time;
wherein if the orderstamp is not received at the selected client machine within the threshold time, the requested transactional operation is not allowed to proceed at the selected client machine.

24. A system implemented across a network that is associated with one or more client machines, wherein the system comprises:
a plurality of computers, wherein each of the computers comprises a processor associated therewith;
a data store for storing data, wherein the data store is distributed between the plurality of computers, wherein at least one portion of the data is duplicated across at least two of the plurality of the computers;
wherein a selected client machine is configured to send a request to a master machine to implement a transactional operation on the data store, wherein the transactional operation comprises an update of at least a portion of the data in the data store;
wherein a processor associated with the master machine is configured to
generate a system orderstamp in response to the received request, wherein the orderstamp uniquely identifies the requested transactional operation,
transmit the system orderstamp to the selected client machine, and
propagate any of the system orderstamp or updated data to each of the plurality of computers at which the data to be updated in response to the requested transactional operation is stored, wherein the updated data reflects results of the requested transactional operation;
wherein the processors associated with each of the plurality of computers at which the data to be updated is stored are configured to update the data store in response to the requested transactional operation; and
wherein the data remains consistent across the data store.

25. The system of claim 24, wherein the master machine and the selected client machine comprise the same client machine.

26. The system of claim 24, wherein at least one of the client machines is further configured to process a non-transactional operation without a receipt of a system orderstamp from the master machine.

27. The system of claim 24, wherein the propagation of any of the system orderstamp or updated data from the master machine comprises:
propagation of the updated data from the master machine computer to any of the client machine or at least one of the other plurality of computers; and
propagation of the updated data from either the client machine or the at least one of the other plurality of computers to a slave computer, wherein the slave computer comprises one of the plurality of computers at which the data to be updated in response to the requested transactional operation is stored.

28. The system of claim 24, wherein upon a failure to receive the system orderstamp at the selected client machine, the requested transactional operation fails.

29. The system of claim 24, wherein the requested transactional operation comprises any of an insert operation or a delete operation.

30. The system of claim 24, wherein the selected client machine is further configured to prevent the requested transactional operation from proceeding if the orderstamp is not received at the selected client machine within the threshold time.

* * * * *